March 7, 1950 R. PROSKAUER ET AL 2,499,413

PULSE GENERATOR

Filed May 17, 1944 3 Sheets-Sheet 1

INVENTORS:
RICHARD PROSKAUER
VICTOR J. YOUNG
BY Paul B. Hunter
ATTORNEY

INVENTORS:
RICHARD PROSKAUER
VICTOR J. YOUNG
BY
Paul B. Hunter
ATTORNEY

INVENTORS:
RICHARD PROSKAUER
VICTOR J. YOUNG
BY
Paul B. Hunter
ATTORNEY

Patented Mar. 7, 1950 2,499,413

UNITED STATES PATENT OFFICE 2,499,413

PULSE GENERATOR

Richard Proskauer, Westbury, and Victor J. Young, Jamaica, N. Y., assignors to The Sperry Corporation, a corporation of Delaware Application May 17, 1944, Serial No. 535,990

10 Claims. (Cl. 250—36)

The present invention relates to circuits for electrc discharge devices, and concerns, particularly, pulse generators.

An object of the invention is to provide relatively simple and inexpensive apparatus, and a convenient method for producing steep pulses of great amplitude and considerable duration.

A further object of the invention is to provide arrangements for generating steep, long pulses with high frequency stability.

A more specific object of the invention is to provide methods and apparatus for producing a voltage or current pulse which exhibits an initial rate of increase, an amplitude and a duration, otherwise not achievable without resorting to higher supply voltage and larger tubes, or both high power supply voltage and high power tubes.

One of the objects of the invention is to provide arrangements for combining the rapid rate of rise characteristic of pulses generated by a "squared-pulse" blocking oscillator with the greater duration achievable from the output of a multivibrator type of oscillator.

Other and further objects and advantages will become apparent as the description proceeds.

In carrying out the invention in its preferred form, two separate pulse generators are employed, one of which is adapted to produce a very steep wave front with adequate amplitude, and the other of which is adapted to produce a pulse having the desired time duration, but a necessarily less than desired initial rate of rise. A mixer is employed for combining the outputs of the two pulse generators so that an output pulse may be produced which has both a high initial rate of rise and a long duration without thereby subjecting either of the pulse generators to excessive average current flow, or requiring excessive peak currents in either generator.

A better understanding of the invention will be afforded by the following detailed description considered in conjunction with the accompanying drawing, and those features of the invention which are believed to be novel and patentable will be pointed out in the appended claims.

In the drawing.

Like reference characters are utilized throughout the drawings to designate like parts.

Figure 1:
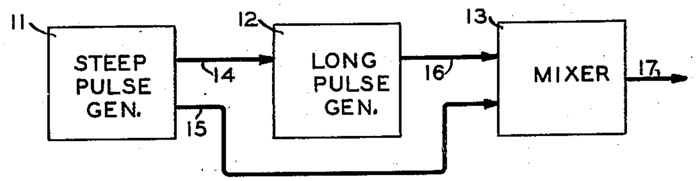
Fig. 1 is a block diagram illustrating an embodiment of the invention for use when it is desired to avoid loading either of the input pulse generators with current supplied at the output.

As represented schematically by Fig. 1 of the drawings, the advantages of steepness or high initial rate of rise of a voltage pulse, and long continued duration of a pulse may be obtained by means of relatively low power apparatus with a low current drain on the power supply by combining a steep-pulse generator 11 with a long pulse generator 12 by means of a mixer 13. Assuming that the steep-pulse generator 11 is self-oscillatory, or that a triggering source is provided for triggering the steep-pulse generator 11, two outputs may be taken from the steep-pulse generator 11, represented by lines 14 and 15, the one output 14 being to synchronize the pulse generator 12 and the output 15 being applied directly to the mixer 13. As represented by the line 16, the output of the long pulse generator 12 is passed to the mixer 13 which combines the two inputs 15 and 16 to produce a steep, long duration pulse at an output channel 17.

Figure 2:
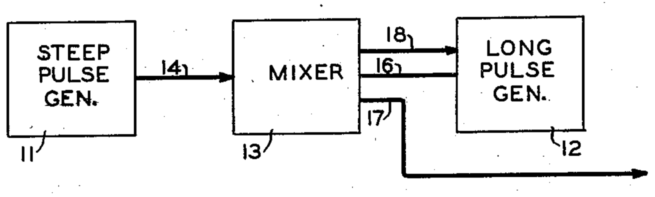
Fig. 2 is a block diagram illustrating the arrangement of the apparatus of Fig. 1, when it is desired to avoid loading the steep-pulse generator with the input impedance of the long-pulse generator.

In order to avoid loading the steep-pulse generator 11 by the input impedance of the long-pulse generator 12 and thereby running the risk of detracting somewhat from the steepness of the output pulse, a high impedance input device, such as the mixer 13, may be interposed between the steep-pulse generator 11 and the long pulse generator 12, for triggering the long pulse generator 12 from the steep-pulse generator 11. For example, as illustrated in Fig. 2, the devices 11 and 13 may be interconnected so as to pass the output of the steep-pulse generator 11 directly to the mixer 13. The mixer 13 may be provided with a synchronizing output represented by a line 18 for synchronizing the long pulse generator 12 which has its output 16 fed back to the mixer 13 as its second input so that the mixer 13 supplies the output 17 which represents the combination of the mixer inputs 14 and 16.

It will be understood that the mixer 13 should be one of the type which does not appreciably load the circuit supplying it, and which supplies an output voltage whose instantaneous value is dependent upon that one of the two input voltages 13 and 16 which is the larger. By employing a low impedance output mixer as in Fig. 1, it is possible to supply a low-impedance pulse-receiving device with a high amplitude, steep, long duration pulse, although the devices 11 and 12 have high impedance outputs.

The invention is not limited to the use of any particular type of pulse generator as the steep-pulse generator 11 and as the long pulse generator 12. It will be understood, however, that it is difficult to combine length and steepness in the same generator. Furthermore, when great steepness or high ratio of "off" to "on" time is desired, or other severe conditions are imposed, it is difficult to obtain high frequency stability. By employing two different pulse generators, although both may be of the same type, one may be designed with circuit constants such as to provide great steepness, and the other with circuit constants such as to provide great length. For example, two multivibrator generators may be employed with different circuit constants so as to satisfy the suggested conditions.

Figure 3:
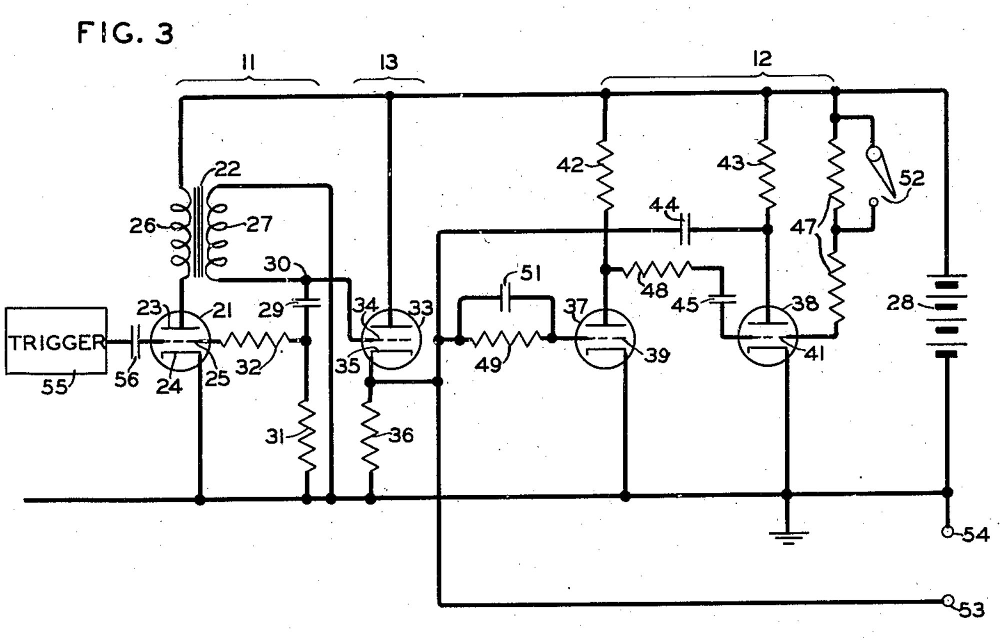
Fig. 3 is a circuit diagram corresponding to Fig. 2.

In the arrangement of Fig. 3 there is shown, for the sake of illustration, an arrangement in which the steep-pulse generator 11 takes the form of a squared-pulse blocking oscillator, the long pulse generator 12 takes the form of a multivibrator circuit, and the mixer 13 takes the form of a cathode follower. In the specific circuit illustrated, it is assumed that he desired output pulse is a voltage pulse of positive polarity, that is, one in which the positive portion of the output wave has the desired high initial rate of rise, and continues at high amplitude for the desired duration of time.

The squared-pulse blocking oscillator 11 may be of a type described in greater detail in the copending application, Serial No. 534,934, filed May 1, 1944, now Patent No. 2,483,431, of Richard Proskauer, one of the present joint inventors. Briefly, such a squared-pulse blocking oscillator may comprise an electric discharge device such as a triode vacuum tube 21, a pulse transformer 22, and suitable coupling elements. The triode 21 comprises an anode 23, a cathode 24 and a control electrode or grid 25. The transformer 22 comprises a primary or anode circuit winding 26 connected in series with the electrodes 23 and 24 of the tube 21, and a secondary or grid winding 27. For supplying the requisite power, a direct current source represented as a battery 28 is provided. It has a positive terminal connected in series with the winding 26 to the anode 23 and a negative terminal connected to the cathode 24, which may be grounded if desired. The coupling elements comprise a coupling condenser 29, a grid leak resistor 31, and a throttling resistor 32. The latter is interposed in series with the coupling condenser 29 between the grid winding 27 and the grid 25.

The cathode-follower 13 comprises an electric discharge device such as a triode vacuum tube having the conventional electrodes, including a grid 34, connected to the high potential output terminal 30 of the blocking oscillator grid winding 27, and having a cathode 35 connected in series with a cathode resistor 36 to the grounded terminal of the power supply 28.

The multivibrator circuit 12 includes a pair of electric discharge devices such as triode vacuum tubes 37 and 38, having conventional electrodes, including control electrodes or grids 39 and 41, respectively, and having conventional anode or load-resistors 42 and 43, respectively. The tubes 37 and 38 are cross-coupled by means of coupling condensers 44 and 45. For squaring the output pulse of the multivibrator circuit 12, throttling resistors 48 and 49 are connected in series with the coupling condensers 45 and 44, respectively. For the purpose of more accurately and uniformly fixing positive pulse duration, the grid 41 is positively biased by means of a grid leak 47 returned to the positive terminal of the power supply 28. The grid 39 is shown as zero biased by connection of the throttling resistor 49 to the cathode resistor 36 of the cathode follower 13. In the specific arrangement shown, the throttling resistor 49 is relatively high in resistance in comparison with the grid-cathode capacity impedance of the tube 37, and accordingly, a small by-pass condenser 51 is provided to overcome the integrating effect of the resistor 49.

For adjusting the pulse length of the multivibrator 12, one of the grid leaks may be made adjustable, or, as illustrated, a portion of the grid leak 47 may be provided with a short-circuiting switch 52.

The combined output pulse may be taken from the cathode-follower cathode 35. If desired separate terminals 53 and 54 may be brought out, connected to the cathode 35 and to the grounded negative terminal of the same 28, respectively.

If synchronization with an external trigger source is desired, such a source 55 may be coupled to blocking oscillator grid 25 through a condenser 56.

The blocking oscillator 11 tends to oscillate at a frequency determined by the time constant of the coupling condenser 29 and the grid-leak resistor 31. Whenever the grid 25 rises above the cut-off potential, current passes through the primary winding 26 of the pulse transformer 22 and, by reason of the connections of the transformer 22, the effect is regenerative with the current in the tube 21 increasing rapidly and inducing a strong, positive voltage pulse at the output terminal 30 of the grid winding 27. The condenser 29 becomes charged when grid-current flows and biases the grid 25 strongly negatively as soon as the voltage of the anode 23 has fallen to such a value that no further increase in tube current takes place. The tube 21 then remains non-conducting until the grid 25 has again drifted in the positive sense until the cut-off potential is again reached. If the external trigger source 55 is employed the tube 21 becomes conducting whenever the triggering pulse is received from the source 55.

Figure 4:
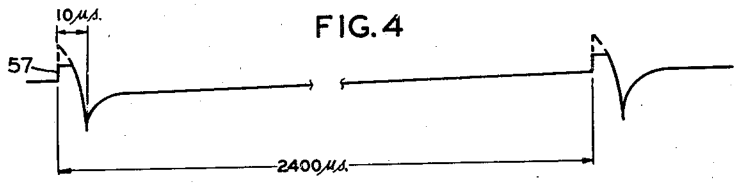
Figs. 4, 5 and 6 are graphs explanatory of the principle of operation of the apparatus and illustrative of wave forms obtained in various portions of the apparatus.
Figure 5:
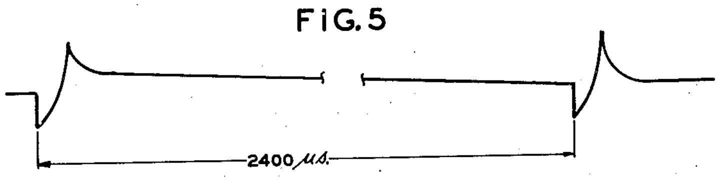

The shape of the voltage pulse at the terminal 30 is represented by the dotted line curve of Fig. 4. As represented by the solid line the actual grid voltage is squared off as a result of the action of the throttling resistor 32 which limits the flow of grid current and so reduces the dissipation of the stored magnetic energy of the transformer 22 by the grid current of the tube 21, thus allowing the wave front 57 of the voltage pulse of Fig. 4 to be very steep and rise very abruptly to a high amplitude. A voltage wave of wave-form similar to that shown by the dotted lines in Fig. 4, is produced with opposite polarity at the anode 23 or by means of a separate secondary winding (not shown). A wave form of the anode voltage is illustrated in Fig. 5.

As is known to those skilled in the art a multivibrator circuit tends to produce an irregular wave form having a frequency determined by the circuit constants and having a ratio of positive to negative portions of the pulse determined by the relative circuit constants associated with the two tubes. By employing the throttling resistors 48 and 49, the wave-form of the multivibrator circuit 12 also is squared off and the amplitude of the wave is allowed to become relatively great.

However, the wave front cannot be expected to be as steep as that produced by the blocking oscillator 11, in which the available energy is utilized in a very short space of time.

Figure 6:
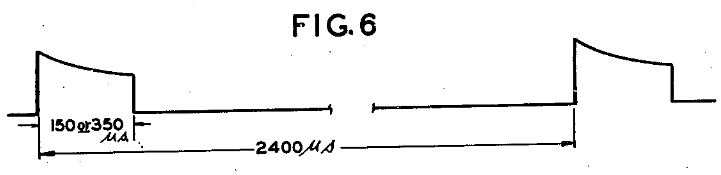

The steep-front short-duration pulse applied to the grid 34 of the cathode follower 13 is reproduced only in its positive portion at the cathode 35 so that a steep front pulse appears at the output terminals 53 and 54. This pulse serves also to synchronize the multivibrator 12 by raising the potential of the grid 39, causing it to become conducting and to cut-off the tube 38 which thereby transmits a positive pulse through the coupling condenser 44 to the anode 35 and the output terminal 53 causing the potential to remain at a high positive value even after the short steep pulse at the grid 34 from the blocking oscillator 11 has disappeared. Accordingly, a wave form appears between the wave terminals 53 and 54, such as illustrated in Fig. 6. Assuming, for the sake of illustration, that the synchronizing source 55 and the multivibrator 12 are adjusted to produce pulses with a period of 2400 microseconds between successive pulses, the arrangement illustrated in Fig. 3 makes it possible to produce long, steep-front high amplitude positive pulses having a duration of 150 microseconds or 350 microseconds, for example, according to whether the switch 52 is opened or closed, whereas the pulse duration of the positive portion of the output wave of the blocking oscillator 11 may last only 10 microseconds or less. The actual pulse duration and the ratio of "on" to "off" time depend, of course, upon the constants employed in the circuit and our invention is not limited to the specific ratios or pulse durations mentioned by way of illustration. The fact that the grid 41 of the multivibrator tube 38 is positively biased results in the grid 41 rising toward cut-off at a relatively large angle instead of asymptotically so that the positive pulse duration is quite precisely fixed.

It will be observed that the cathode follower mixer 13 produces an output voltage which is as great at any instant as the instantaneous value of whichever input voltage is greater. For example, as long as the multivibrator output voltage is rising gradually, the potential of grid 53 is determined by the steep-front positive pulse applied to the grid 34, whereas, after the voltage at the grid 34 has fallen off the potential of the terminal 53 is determined by the positive output potential of the multivibrator circuit 12. The cathode follower 13 has a high impedance input so that it does not load the blocking oscillator 11 and impair the steepness of its output. The multivibrator output may be connected directly to the cathode resistor 36 inasmuch as it is not necessary to preserve the steepness of this output. Accordingly, a relatively low impedance output is available at the terminals 53 and 54.

The steep front, long duration pulse producing apparatus described may also be utilized for the production or synthesis of a useful approximation to a voltage "step function" for synthetically testing various kinds of electrical apparatus, for example, for observing the operation of experimental delay lines. A voltage "step function" is a voltage which changes abruptly from one value to another at a given instant, which has a time derivative which is infinite at that instant and which is zero at all other times. Although such "step functions" cannot be realized exactly, the apparatus described herein has been found to form a satisfactory approximation.

Figure 7:
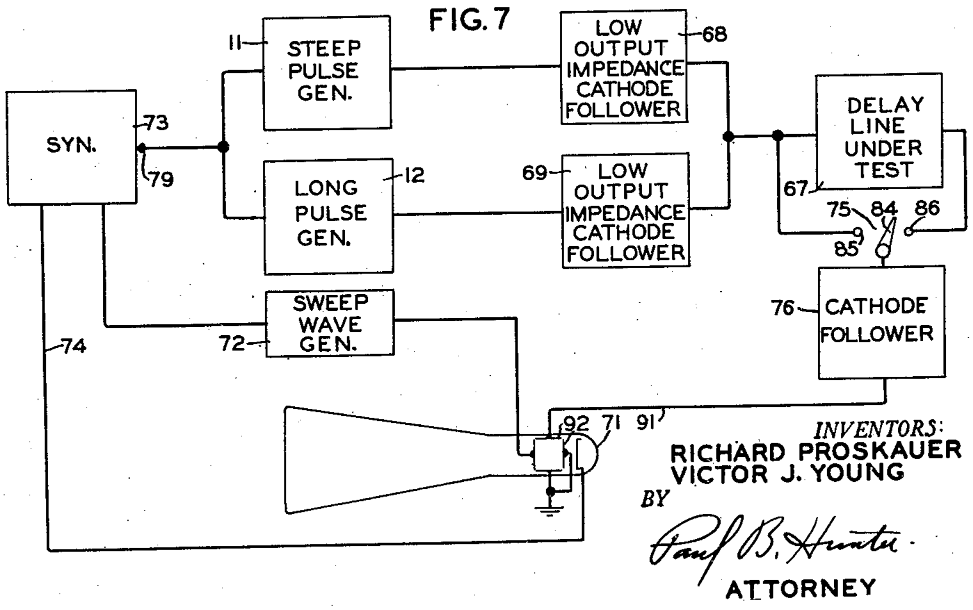
Fig. 7 is a block diagram of apparatus employing the arrangement of the foregoing figures for test purposes.

For example, if it is desired to observe the behavior of a delay line 67, as shown in the block diagram of Fig. 7, a test apparatus may be utilized comprising a steep pulse generator 11, a long pulse generator 12, as hereinbefore described, with mixing means comprising a pair of low output impedance cathode followers 68 and 69, a cathode ray indicator or oscilloscope 71 having a sweep wave generator 72, and a common synchronizer 73 for the generators 11, 12 and 72 and for a blanking circuit 74 of the indicator 71. A double-throw switch 75 may be provided for applying either the input voltage wave form or the output voltage wave form of the delay line 67, to a signal deflection circuit of the cathode ray indicator 71. Preferably an additional cathode follower 76 is provided to prevent loading the delay line 67.

Figure 8:
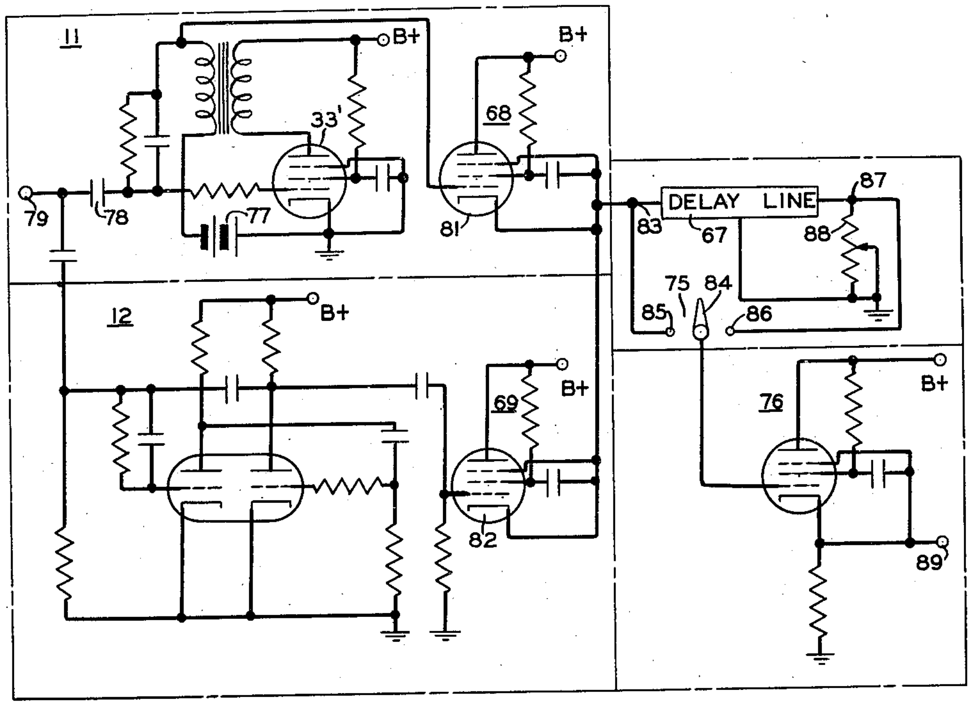
Fig. 8 is a circuit diagram of the apparatus of Fig. 11.

Any suitable form of synchronizer may be employed, for example, the synchronizer 73 may take the form described in greater detail in the co-pending application, Serial No. 535,989 of the present joint applicants, filed May 17, 1944, now abandoned. As shown by the circuit diagrams of Fig. 8, the steep-pulse generator 11 and the long pulse generator 12 may be similar to the circuits shown in Fig. 3. However, for the sake of causing the blocking oscillator circuit 11 to act only when triggered, its grid may be negatively biased by means of a "C" battery 77. The invention is obviously not limited to triode vacuum tubes, and as shown in Fig. 8 a pentode tube 33' is employed for the blocking oscillator 11. Both the blocking oscillator 11 and multivibrator 12 are coupled through coupling condenser 78 to a trigger output terminal 79 of the synchronizer 73.

In order that neither the steep-pulse generator 11 nor long pulse generator 12 will be loaded by the delay line 67, separate cathode followers 68 and 69 are employed for mixing the outputs of generators 11 and 12. As shown, the cathode followers 68 and 69 are pentode connected and have low output impedances with cathodes 81 and 82 connected together to the input terminal 83 of the delay line 67. The transfer switch 75 comprises a movable blade 84 coupled to the input grid of the cathode follower 76 and a pair of stationary terminals 85 and 86 connected, respectively, to the input terminal 83 of delay line and an output terminal 87 thereof.

It will be understood that the delay line 67 is grounded, and for the purpose of testing the behavior of the delay line 67 under different terminal conditions, an adjustable impedance termination in the form of a rheostat 88 is provided which is connected between the output terminal 87 of delay line 67 and the ground connection.

The cathode follower 76 has a cathode terminal or output terminal 89 connected through a suitable circuit, shown for the sake of simplicity as a conductor 91, to signal deflection plates 92 of the cathode ray indicator 71.

Whenever the apparatus is triggered by the synchronizer 73, the cathode ray beam of the indicator 71 is swept across its screen by the sweep wave generator 72 and a step function pulse, that is, a voltage pulse with a very steep rise and of relatively long duration in comparison with delay line constants 67 is initiated and applied to the delay line 67. If the transfer switch 75 is moved to the right-hand position with the blade 84 in contact with the terminal 86, the output voltage of the delay line 67 is applied to the deflection plates 92 of the indicator 71 and the effect of the delay line on the step function voltage may be observed. For the purpose of comparison of the output wave form with the input wave form, the change-over switch 75 may be moved to the lefthand position whereby the input step function to the delay line 67 is impressed upon the signal deflection circuit of the indicator 71.

We have herein shown and particularly described certain embodiments of our invention and certain methods of operation embraced therein for the purpose of explaining its principle of operation and showing its application, but it will be obvious to those skilled in the art that many modifications and variations are possible, and we aim, therefore, to cover all such modifications and variations as fall within the scope of our invention which is defined in the appended claims.

What is claimed is:

1. A generator for producing steep-front long-duration pulses, comprising in combination, an electronic steep-pulse generator, an electronic long-pulse generator, said steep-pulse generator and said long-pulse generator being adjusted for operation at a common repetition rate, and mixer means for combining the output wave forms of said generators, said mixer means being so arranged as to provide output voltage variations in response to one of said pulses in the absence of the other of said pulses.

2. Apparatus of the type set forth in claim 1, in which the mixing means provides an output voltage whose instantaneous value is dependent upon that one of the two input voltages which is the larger.

3. A generator for supplying steep-front, long-duration pulses to a low impedance load, comprising in combination, a steep-pulse generator, a long-pulse generator, a high impedance input mixer interposed between said steep-pulse generator and long-pulse generator for triggering the latter, a coupling between the long-pulse generator and the mixer for combining therein the output of the long-pulse generator with that of the steep-pulse generator.

4. A generator for producing steep-front long pulses, comprising in combination, a squared-pulse electronic blocking oscillator, a multivibrator oscillator with constants for producing a relatively long pulse, said oscillators being synchronized at a common repetition rate, and means for mixing the outputs of the two oscillators.

5. Apparatus as in claim 4 in which said mixing means comprises a cathode follower interposed between the blocking oscillator and the multivibrator for triggering the multivibrator from the blocking oscillator, and mixing the outputs thereof in the cathode follower.

6. In combination, a resistance-capacity-timed oscillator with constants for producing a steep, short pulse, a resistance-capacity-timed oscillator with constants for producing a relatively long-duration pulse, means for synchronizing said oscillators at a common frequency of oscillations, and means for combining the outputs of said oscillators.

7. In combination, a blocking oscillator producing a steep high amplitude pulse, a non-inductive relaxation oscillator producing a pulse of longer duration than the duration of said steep high amplitude pulse, means synchronizing said oscillators at a common oscillation frequency, and means for combining the outputs thereof to provide a composite pulse wave combining the characteristics of the output pulse of said blocking oscillator and the output pulse of said relaxation oscillator.

8. In combination, a blocking oscillator, a multivibrator having a pair of control grids, and a coupling between the blocking oscillator and one of said control grids for synchronizing the multivibrator from the blocking oscillator and mixing the blocking oscillator wave form with that of the multivibrator.

9. Apparatus for producing a steep front long duration positive voltage pulse, comprising in combination, a multivibrator including a tube producing a positive output pulse, a blocking oscilliator, means for triggering said multivibrator tube from said blocking oscillator to initiate a long pulse, and means for combining the steep wave front of the blocking oscillator pulse with said long pulse.

10. In combination, blocking oscillator means for producing recurrent impulses characterized by a first repetition rate and by a first wave shape including steep fronts, multivibrator means for producing recurrent impulses characterized by greater duration than the impulses produced by said blocking oscillator means and by a repetition rate of the same order as said first repetition rate, means synchronizing said blocking oscillator means and said multivibrator means for maintaining substantially fixed phasal relation between respective impulses produced by said blocking oscillator means and said multivibrator means, said impulses being maintained in an overlapped phase, and means combining the respective impulses produced by said blocking oscillator means and said multivibrator means for producing composite impulses at said first repetition rate characterized by steep impulse wave fronts and by a duration substantially equal to the duration of the pulses produced by said multivibrator means.

RICHARD PROSKAUER.
VICTOR J. YOUNG.

REFERENCES CITED

The following references are of record in the file of this patent:

UNITED STATES PATENTS

| Number | Name | Date |
|---|---|---|
| 1,315,539 | Carson | Sept. 9, 1919 |
| 1,948,169 | Eremeeff | Feb. 20, 1934 |
| 2,104,690 | Bedford | Jan. 4, 1938 |
| 2,145,483 | Jacob | Jan. 31, 1939 |
| 2,146,091 | Peterson | Feb. 7, 1939 |
| 2,190,504 | Schlesinger | Feb. 13, 1940 |
| 2,226,459 | Bingley | Dec. 24, 1940 |
| 2,243,234 | Von Duhn | May 27, 1941 |
| 2,250,708 | Herz | July 29, 1941 |
| 2,250,819 | Wolf | July 29, 1941 |
| 2,275,460 | Page | Mar. 10, 1942 |
| 2,292,100 | Bliss | Aug. 4, 1942 |
| 2,310,328 | Swift | Feb. 9, 1943 |
| 2,415,918 | Thomas | Feb. 18, 1947 |
| 2,426,216 | Hight | Aug. 26, 1947 |

OTHER REFERENCES

Brainerd, Ultra-High-Frequency Techniques, D. Van Nostrand Co., Inc., New York, 1942, page 504.

Radio Retailing Today; January 1944, pages 48–49.